United States Patent [19]

Sugimori et al.

[11] Patent Number: 5,953,062
[45] Date of Patent: *Sep. 14, 1999

[54] EXPOSURE CONTROL DEVICE FOR OPTICAL APPARATUS

[75] Inventors: Masami Sugimori; Futoshi Kai, both of Kanagawa-ken, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/418,265

[22] Filed: Apr. 6, 1995

Related U.S. Application Data

[63] Continuation of application No. 08/070,534, Jun. 1, 1993, abandoned.

[30] Foreign Application Priority Data

Jun. 5, 1992 [JP] Japan ..................... 4-145872
Jun. 9, 1992 [JP] Japan ..................... 4-149225
Sep. 8, 1992 [JP] Japan ..................... 4-239352

[51] Int. Cl.$^6$ .......................... H04N 5/228; H04N 5/238
[52] U.S. Cl. .................... 348/364; 348/222; 396/256; 396/260
[58] Field of Search ...................... 348/221, 362, 348/363, 364, 365, 367, 368, 224, 366, 222; 354/435, 439, 446, 451, 452, 226, 227.1, 270, 270.1; 396/246, 256, 260

[56] References Cited

U.S. PATENT DOCUMENTS 4,005,448  1/1977  Iwata et al. ..................... 354/30
4,017,872  4/1977  Iwata et al. ..................... 354/60
4,037,254  7/1977  Monahan ........................ 348/363
4,710,691 12/1987  Bergstrom et al. .............. 318/696
4,743,934  5/1988  Yoshida et al. ................. 396/244
4,751,445  6/1988  Sakai ........................... 318/696
4,864,347  9/1989  Nakagawa et al. .............. 354/439
4,920,420  4/1990  Sano et al. .................... 348/351
4,998,129  3/1991  Watanabe et al. ............... 354/452
5,003,339  3/1991  Kikuchi et al. ................. 348/347
5,040,017  8/1991  Arai et al. ..................... 396/244
5,128,769  7/1992  Arai et al. ..................... 348/363
5,194,956  3/1993  Iwamoto ........................ 358/209
5,325,149  6/1994  Kawahara ....................... 354/446

Primary Examiner—Wendy Garber
Assistant Examiner—Ngoc-Yen Vu
Attorney, Agent, or Firm—Robin, Blecker & Daley

[57] ABSTRACT

An optical apparatus includes a light quantity adjusting member arranged to vary a quantity of light when the member is moved, a stepping motor arranged to drive the light quantity adjusting member, a luminance detecting part for detecting the luminance of a shooting object on the basis of the quantity of light obtained through the light quantity adjusting member, and a control circuit for driving and controlling the stepping motor in such a way as to make a difference between the luminance of the object detected by the luminance detecting part and a target luminance value smaller, the control circuit being arranged to change the driving speed of the stepping motor to be lowered when the object luminance comes near to the target luminance value.

10 Claims, 14 Drawing Sheets

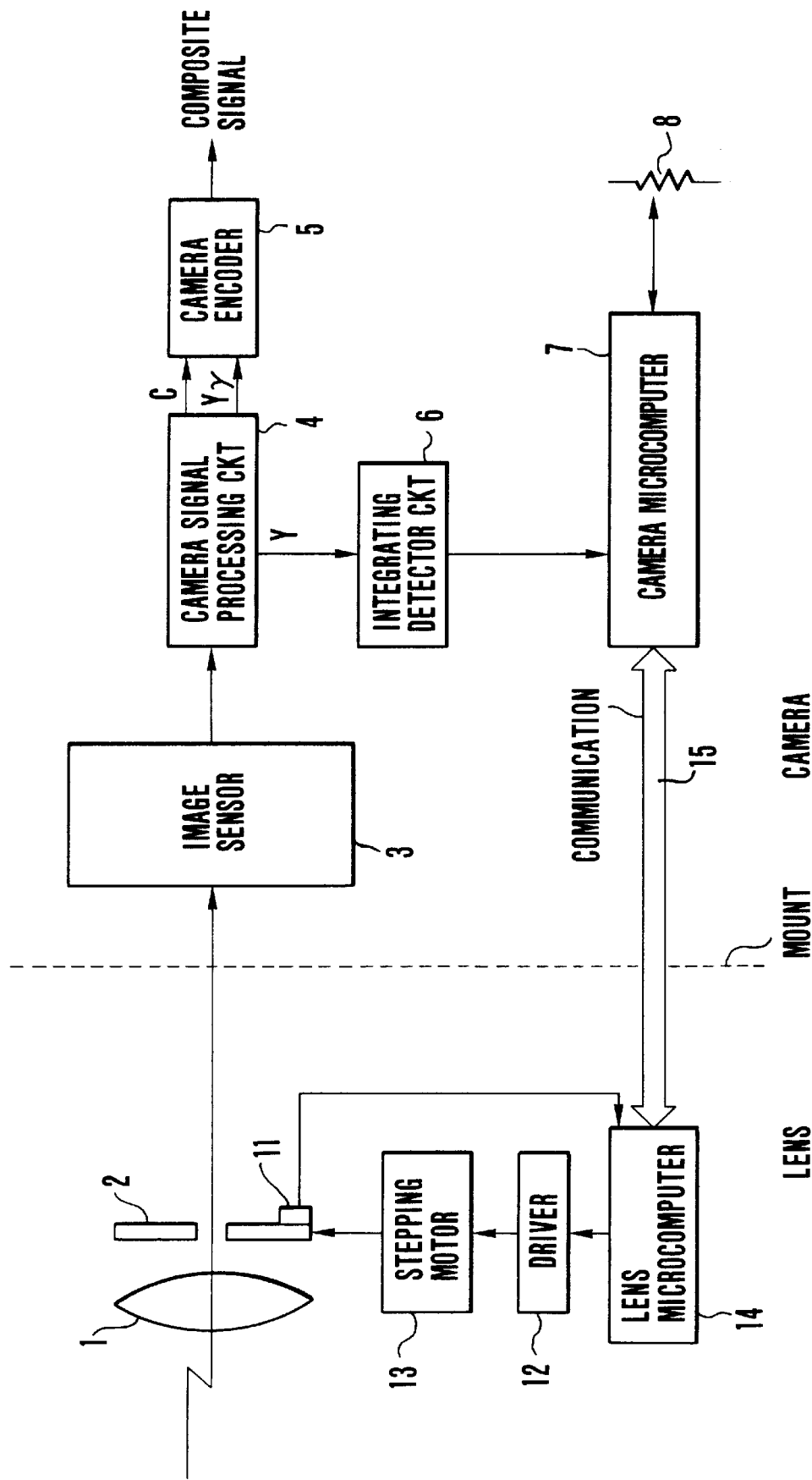

CAMERA SIDE

LENS SIDE

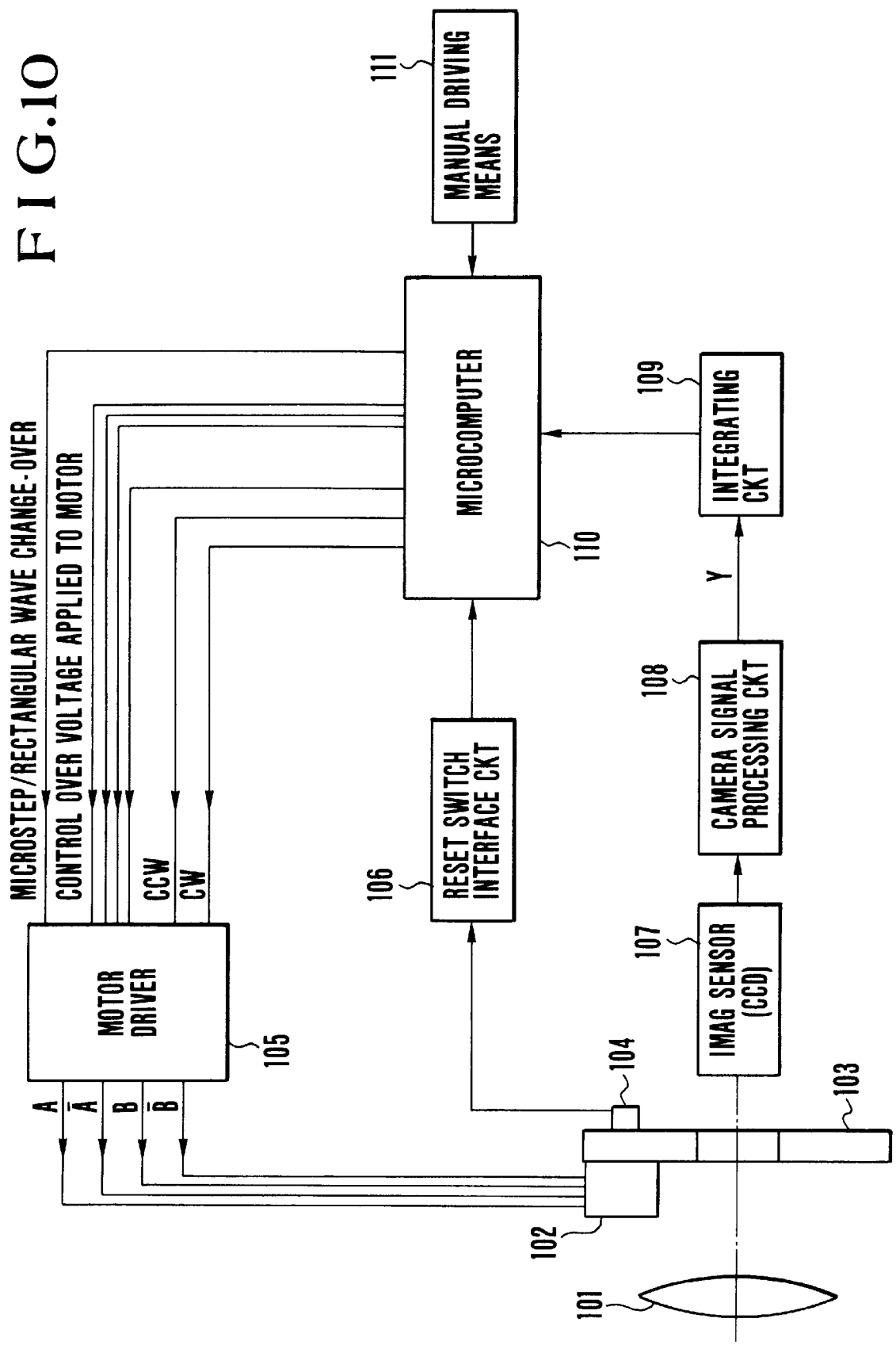

RECTANGULAR WAVE

TORQUE CURVE IN CASE OF RECTANGULAR WAVE

MICROSTEP WAVE

TORQUE CURVE IN CASE OF MICROSTEP WAVE

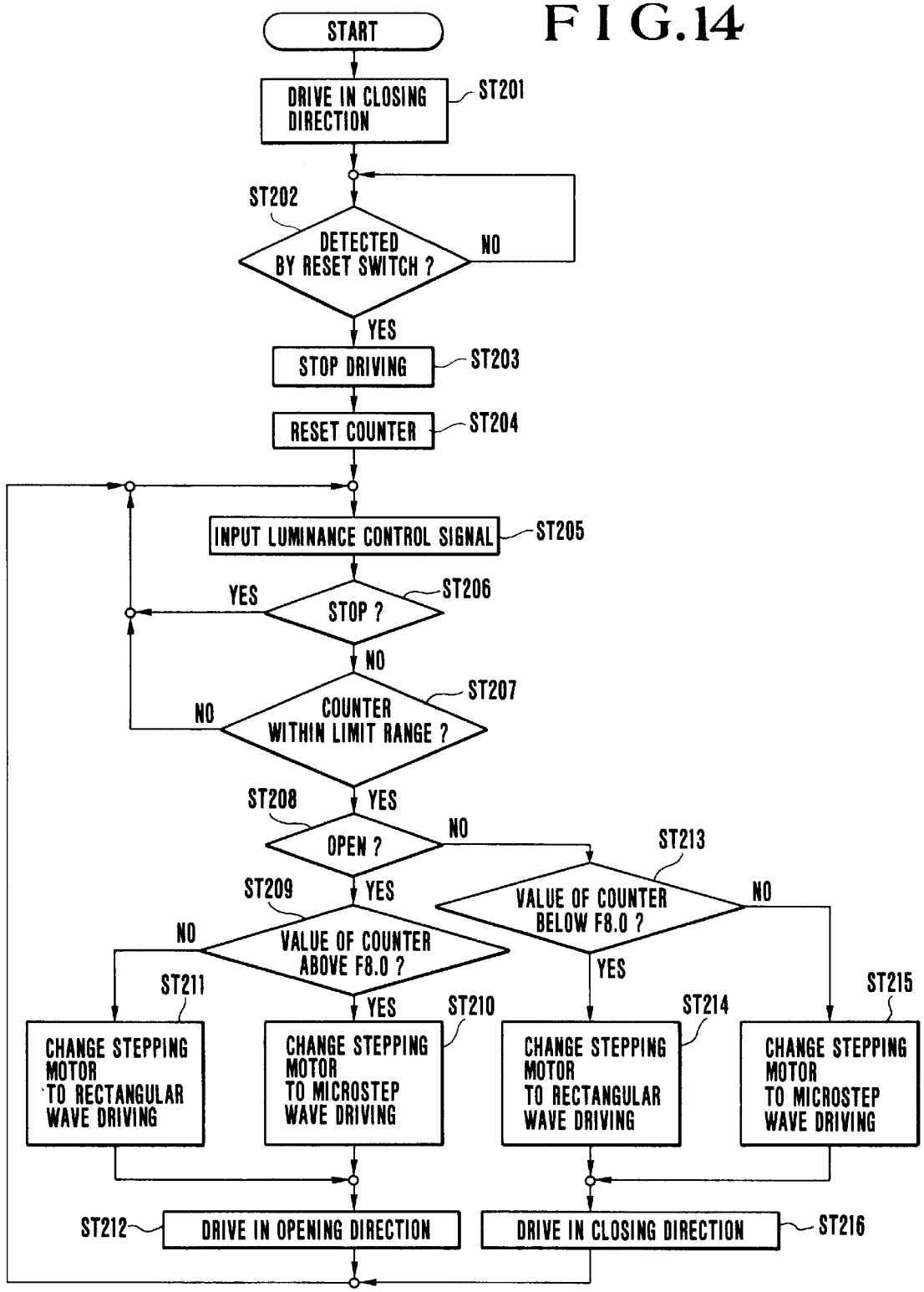

EXPOSURE CONTROL DEVICE FOR OPTICAL APPARATUS

This is a continuation application under 37 CFR 1.62 of prior U.S. application Ser. No. 08/070,534, filed Jun. 1, 1993 (abandoned).

BACKGROUND OF THE INVENTION

1. Field of the Invention:

This invention relates to an exposure control device for an optical apparatus of the kind arranged to drive an exposure amount adjusting member by means of a stepping motor.

2. Description of the Related Art:

The arrangement and operation of the automatic exposure control device of the conventional video camera are described below with reference to FIG. 5:

The incident light of an image taken from an object through a lens optical system 1 comes to iris blades 2. The quantity of the incident light is adjusted by the iris blades 2 and, after that, the incident light is imaged on the image pickup plane of an image sensor 3. The object image thus formed on the image sensor 3 is photo-electrically converted into a picked-up image signal. The picked-up image signal is supplied to a camera signal processing circuit 4. The camera signal processing circuit 4 then performs various processes such as gamma conversion, etc., to obtain a chrominance signal C and a luminance signal $Y_\gamma$ as video signals. These signals are supplied to a camera encoder 5 to be converted into an NTSC signal. The NTSC signal thus obtained is outputted to the outside from a camera part in the form of a composite video signal or the like.

Meanwhile, a luminance signal Y outputted from the camera signal processing circuit 4 is supplied to an integrating detector circuit 6 to be used for generating a control signal for controlling the iris blades 2 in such a way as to give an exposure apposite to the luminance condition of the image plane. The output of the integrating detector circuit 6 is taken in by a camera microcomputer 7. At the camera microcomputer 7, a value obtained by the integrating detection process of the integrating detector circuit 6 is compared with a reference value (an apposite exposure value). A signal indicating a difference between the two values is outputted to a driver 9. The driver 9 then converts the signal from the camera microcomputer 7 into an apposite voltage. The voltage is applied to an actuator 10. The actuator 10 drives the iris blades 2 accordingly.

Further, an encoder 11 is arranged to detect the position of the iris blades 2. Information on the position of the iris blades 2 thus detected is supplied to the camera microcomputer 7 and to an AF (automatic focusing) microcomputer.

In the automatic exposure control device of the video camera described, the actuator 10 which is arranged to drive the iris blades 2 is an electromagnetic motor of an analog type. The driver 9 which is arranged to drive the electromagnetic motor is also composed of an analog circuit. A control system for controlling the motor is formed as a closed-loop control system. In such a closed-loop control system that is arranged to operate by using analog signals, inadequate matching between control elements tends to cause an instability phenomenon such as oscillations, hunting or the like of the iris blades which is being controlled. To avoid such instability phenomena as oscillations, hunting and the like, the dynamic characteristic and frequency response of an iris mechanism of the camera must be constant. However, the dynamic characteristic and frequency response of the iris mechanism of one camera somewhat differ from those of another camera. The conventional automatic exposure control device, therefore, tends to cause such instability phenomena as oscillations, hunting and the like to take place in the iris blades. The oscillations or hunting tends to take place particularly when a difference between the luminance signal and the reference luminance value is small, i.e., accordingly as the position of the iris blades comes near to a desired value.

SUMMARY OF THE INVENTION

It is one aspect of this invention to provide an exposure control device for an optical apparatus, wherein a light quantity adjusting member is arranged to be driven by a stepping motor serving as a drive source, and the light quantity adjusting member is slowly driven when its position comes near to a target point by changing the mode of driving the stepping motor from rectangular wave driving over to microstep wave driving.

It is another aspect of the invention to provide an exposure control device for an optical apparatus, wherein a light quantity adjusting member is arranged to be driven by a stepping motor serving as a drive source, and the mode of driving the stepping motor is controlled to lower the driving speed of the stepping motor when the position of the light quantity adjusting member comes near to a target point.

It is a further aspect of the invention to provide an exposure control device for an optical apparatus, wherein a light quantity adjusting member is arranged to be driven by a stepping motor serving as a drive source, and the driving speed of the stepping motor is varied according to an aperture value resulting from the driving.

The above and other aspects and features of this invention will become apparent from the following detailed description of embodiments thereof given in connection with the accompanying drawings.

BRIEF DESCRIPTION OF THE DRAWING

FIG. 8 is a block diagram showing an interchangeable lens type video camera having an automatic exposure control device which is arranged as a fourth embodiment of this invention.

FIG. 10 is a block diagram showing the arrangement of essential parts of a video camera having an iris device according to a fifth embodiment of the invention.

FIG. 14 is a flow chart showing the function of an iris device arranged as a sixth embodiment of this invention and the control actions of the microcomputer included in FIG. 10.

DETAILED DESCRIPTION OF THE PREFERRED EMBODIMENTS

Figure 1:
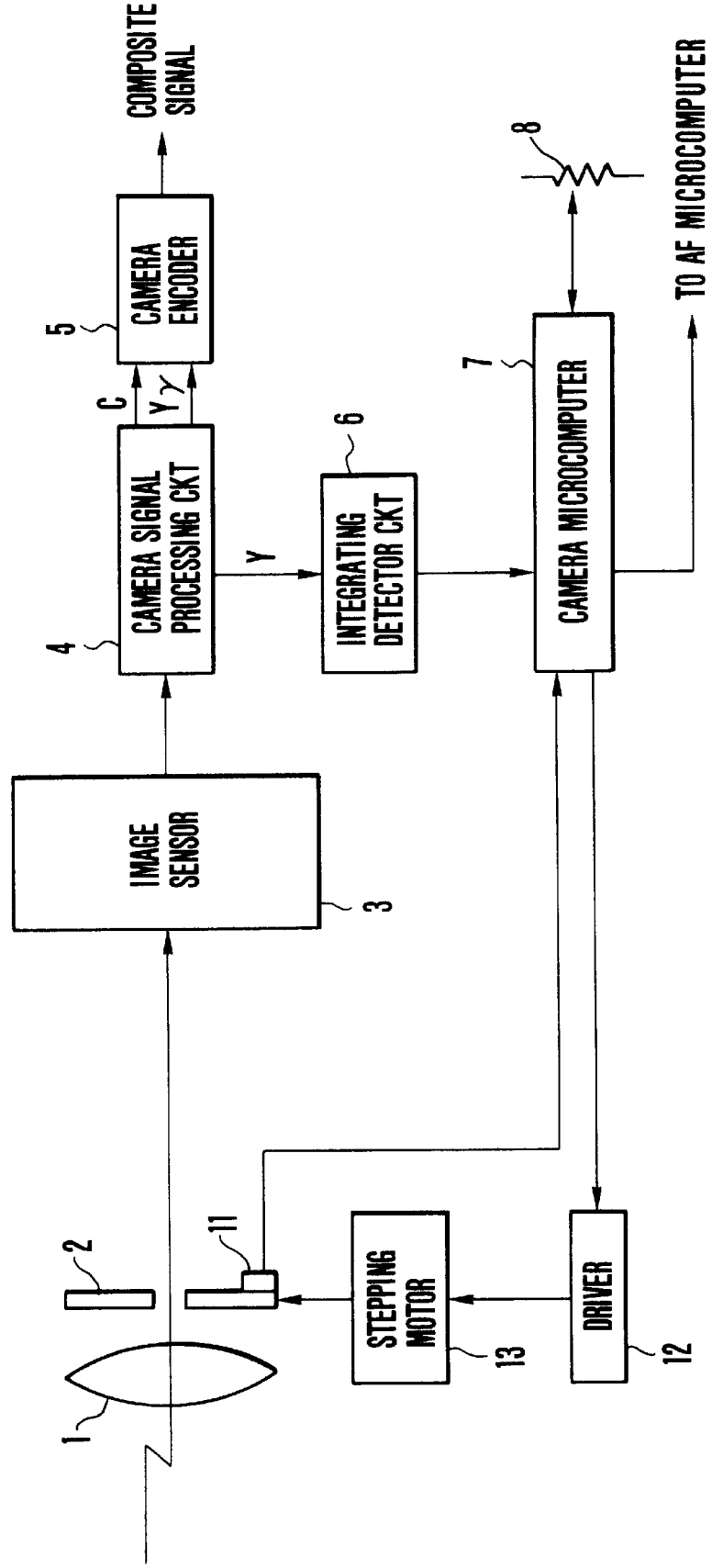
FIG. 1 is a block diagram showing in outline the essential parts of an uninterchangeable lens type video camera having an automatic exposure control device which is arranged as a first embodiment of this invention.

A video camera having an automatic exposure control device arranged as a first embodiment of this invention is described in detail as follows:

FIG. 1 is a block diagram showing in outline the essential parts of the video camera which is provided with the automatic exposure control device of this invention.

The quantity of light of an image which is picked up from an object and incident on a lens optical system 1 is adjusted by iris blades 2 which are arranged as a light quantity adjusting member. After the light quantity adjustment, the light is imaged on the image pickup plane of an image sensor 3. The object image which is thus formed on the image sensor 3 is photo-electrically converted by the image sensor 3 and is supplied to a camera signal processing circuit 4 as a picked-up image signal. The camera signal processing circuit 4 performs various processes such as gamma conversion, etc., to obtain from the image signal a chrominance signal C and a luminance signal $Y_\gamma$ which are taken out as video signals. The video signals are supplied to a camera encoder 5 of the NTSC type to be outputted to the outside of a camera part in the form of a composite video signal or the like.

Meanwhile, a luminance signal Y is supplied from the camera signal processing circuit 4 to an integrating detector circuit 6 for the purpose of generating a control signal for controlling the iris blades 2 in such a way as to give an exposure apposite to the luminance condition of the image plane. The luminance signal Y is thus taken in by a camera microcomputer 7 through the integrating detector circuit 6. Further, at the camera microcomputer 7, the luminance signal Y is compared with a reference value (apposite exposure value) by a comparator 8. As a result of comparison, a rectangular wave having a period which corresponds to a difference from the apposite exposure value is sent to a driver 12.

The driver 12 then drives a stepping motor 13 at a speed according to the rectangular wave input. The camera microcomputer 7 detects, from information obtained from the encoder 11, as to how far the iris blades 2 are away from their reset position, by counting the number of pulses of the rectangular wave outputted therefrom.

Figure 2:
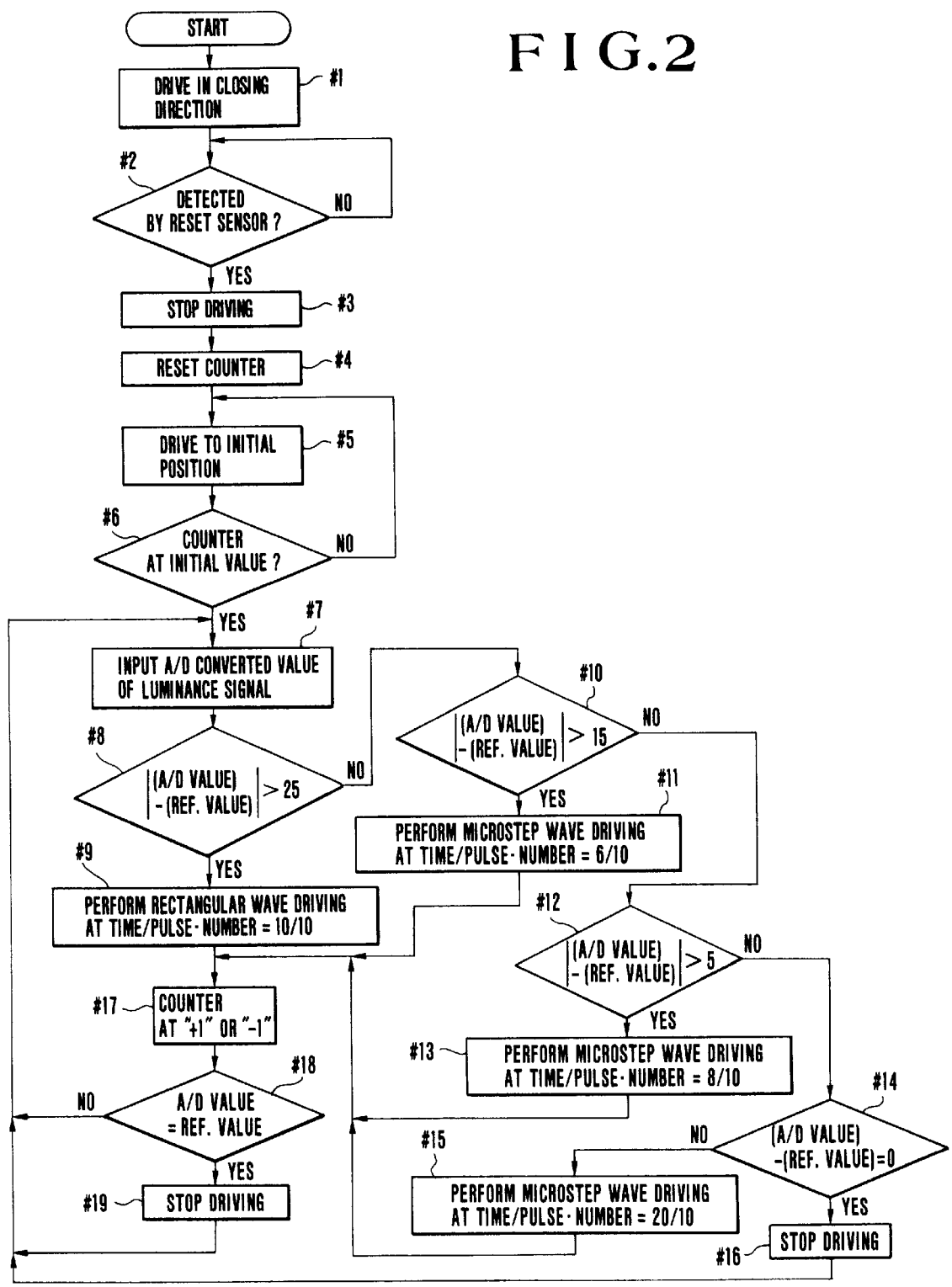
FIG. 2 is a flow chart showing control actions to be executed by a camera microcomputer included in the video camera shown in FIG. 1.

FIG. 2 shows in a flow chart the control actions to be executed within the camera microcomputer 7. The control actions are described below with reference to FIG. 2:

At a step #1, the iris blades 2 are driven in the direction of closing them. At a step #2, a check is made to find if the iris blades 2 has come to a reset sensor position. If so, the flow of control actions comes to a step #3. At the step #3, a driving action on the iris blades 2 is brought to a stop. At a step #4, a counter is reset. At a step #5, the iris blades 2 are driven to an initial position. At a step #6, a check is made to find if the counter has come to have an initial value. If so, the flow comes to a step #7. At the step #7, an A/D (analog-to-digital) converted value of the luminance signal is inputted for commencement of automatic focusing (hereinafter referred to as AF) control. At a step #8, a check is made to find if the absolute value of a difference between the A/D converted value of the luminance signal and a preset reference value is above "25". If so, the flow comes to a step #9. At the step #9, the iris blades 2 are driven at "time/pulse-number =10/10" in the direction of the plus or minus sign of the difference. If not, the flow comes to a step #10.

At the step #10, a check is made to find if the absolute value of the difference between the A/D converted value obtained by the step #7 and the preset reference value is above "15". If so, the flow comes to a step #11. At the step #11, the iris blades 2 are driven in a mode of microstep wave driving at "time/pulse-number =6/10" in the direction of the pulse or minus sign of the difference. If not, the flow comes to a step #12. At the step #12, a check is made to find if the absolute value of the difference between the A/D converted value obtained by the step #7 and the preset reference value is above "5". If so, the flow comes to a step #13. At the step #13, the iris blades 2 are driven in the microstep wave driving mode at "time/pulse-number =8/10" in the direction of the plus or minus sign of the difference. If not, the flow comes to a step #14. At the step #14, a check is made to find if the difference between the A/D converted value obtained by the step 7 and the preset reference value is "0". If not, the flow comes to a step #15. At the step #15, the iris blades 2 are driven in the microstep wave driving mode at "time/pulse-number =20/10" in the direction of the plus or minus sign of the difference, as the difference checked at the step 10 is not "0". If the difference is found to be "0" at the step #14, the flow comes to a step #16. At the step #16, the driving action on the iris blades 2 is brought to a stop, as the difference checked at the step #10 is "0".

At a step #17, the value of the counter is updated in the direction of the plus or minus sign. At a step #18, a check is made to find if the A/D converted value obtained by the step #7 is equal to the reference value. If so, the flow comes to a step #19 to bring the driving action to a stop as the A/D converted value is equal to the reference value.

Figure 3:
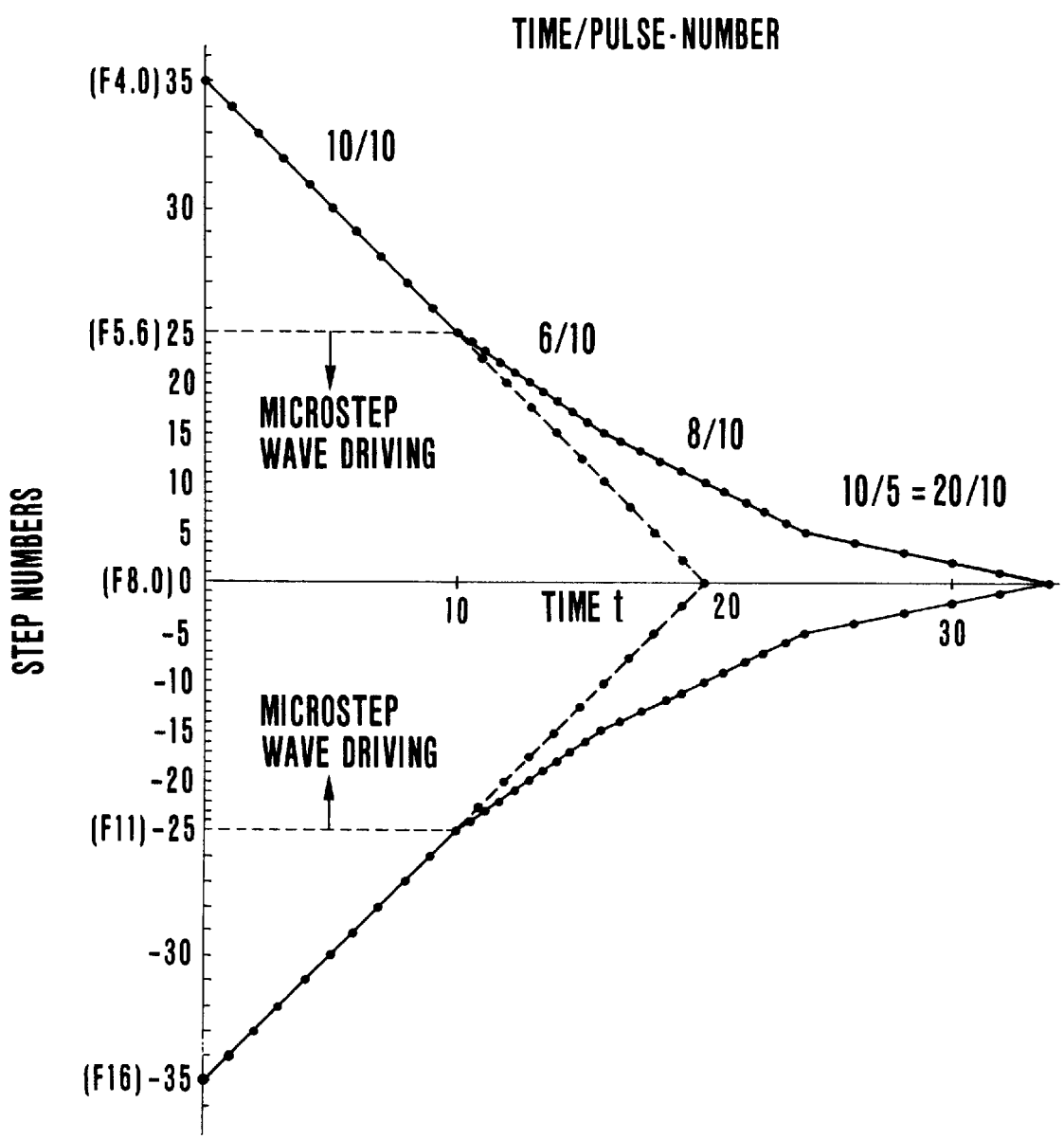
FIG. 3 is a graph showing a relation between the iris blade driving time and the opening amount of the aperture of the first embodiment in the arrangement thereof shown in FIG. 1.

The iris blades 2 are controlled through the stepping motor by repeating the control actions described above. With the control actions carried out, the incident light can be smoothly converged to the luminance reference value as shown in a graph of FIG. 3.

A second embodiment of this invention is described as follows:

The resolution of the device can be virtually enhanced by increasing a microstep wave dividing number. In the case of the second embodiment, therefore, the driving mode is changed over to microstep wave driving when the difference between the luminance signal and the reference value becomes lower than a certain level. Further, the microstep wave dividing number is increased to lower the driving speed accordingly as an aperture defined by the iris blades comes nearer to the reference value, so that the light can be smoothly converged into the reference value. This arrangement is advantageous particularly for small apertures.

Figure 4:
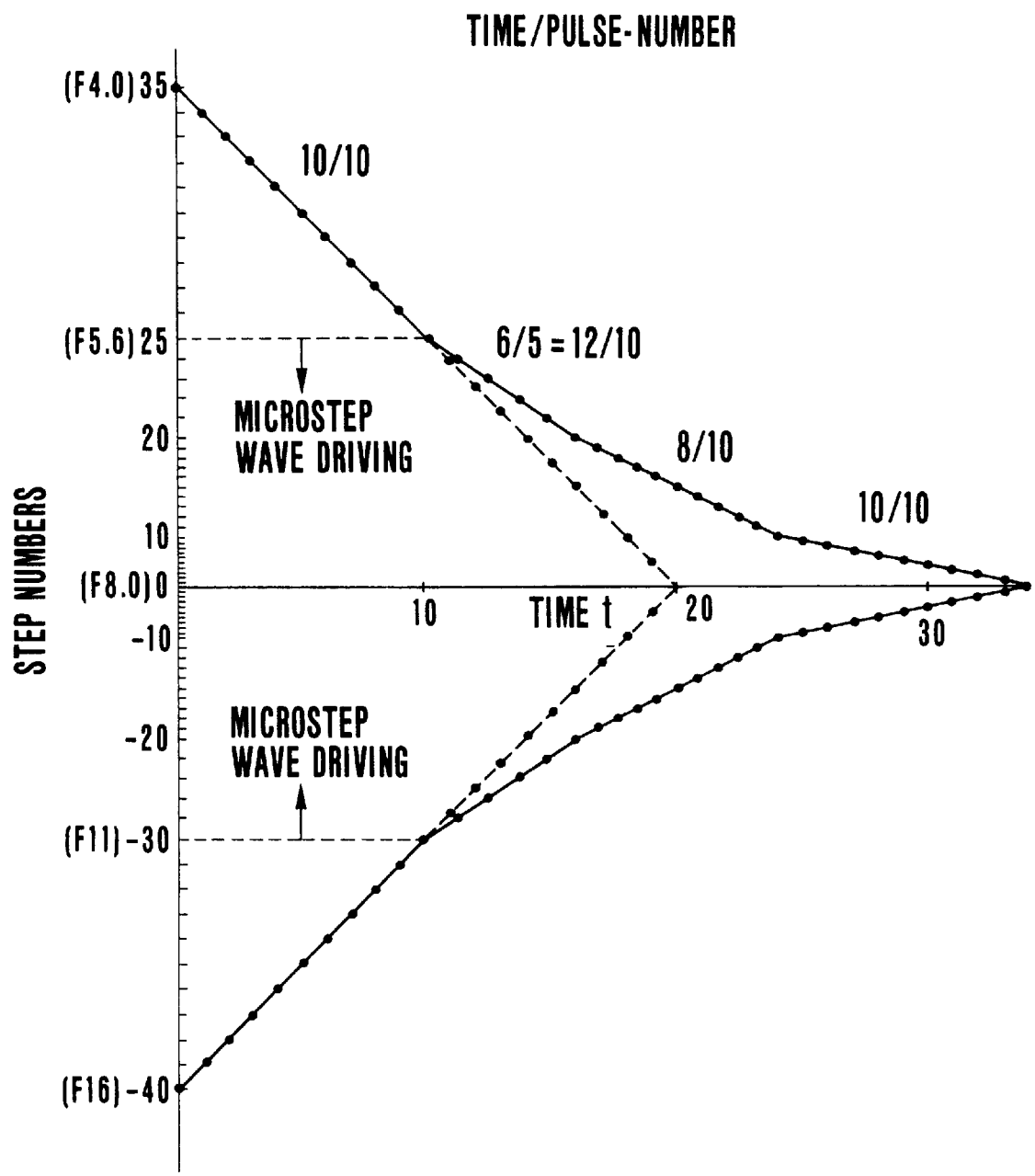
FIG. 4 is a graph showing a relation between the iris blade driving time and the opening amount of the aperture of a second embodiment of this invention in the arrangement shown in FIG. 1.

The graph of FIG. 4 shows the above-stated arrangement of the second embodiment. This embodiment is described in detail as follows: Referring to FIG. 4, the reference value is set at F 8, for example. The resolution of driving virtually increases accordingly as the aperture comes nearer to the reference value. By further lowering the driving speed, the incident light can be smoothly converged to the reference value.

According to the invented arrangement of the first and second embodiments described above, the stepping motor driving mode is changed over to the microstep wave driving mode when a difference between the luminance signal and the reference luminance value becomes less than a certain level. Then, the driving speed is further lowered to have the incident light smoothly converged to the luminance reference value, so that not only hunting or oscillations can be prevented but also transient changes of luminance can be prevented from taking place.

Figure 6:
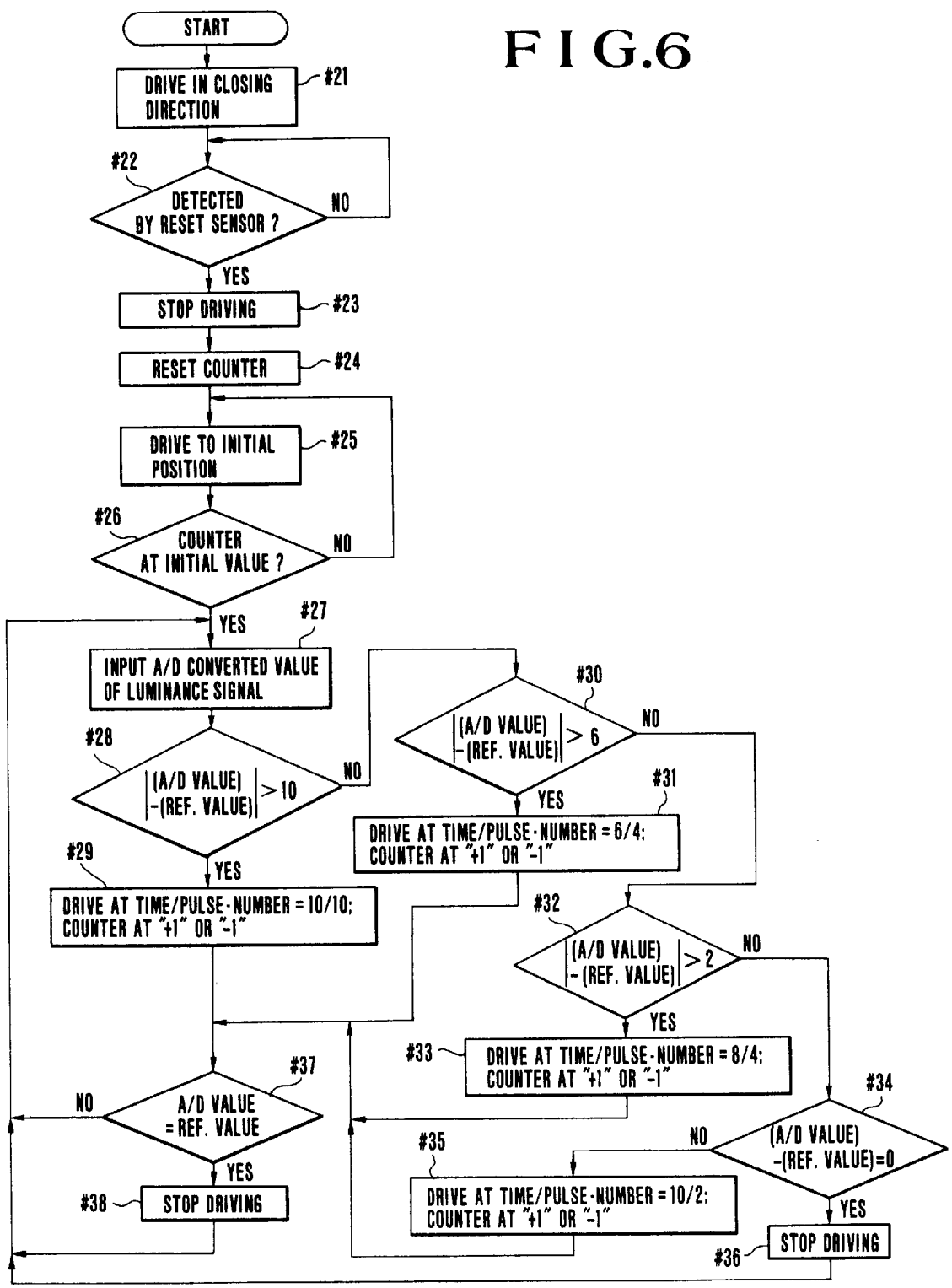
FIG. 6 is a flow chart showing control actions to be executed by the camera microcomputer of a third embodiment of this invention in the arrangement of FIG. 1.

Next, referring to FIG. 6 which is a flow chart, control actions to be executed by the camera microcomputer 7 of a third embodiment of this invention is described as follows: At a step #21, the iris blades 2 are driven in the direction of closing them. At a step #22, a check is made to find if the iris blades 2 have come to a reset sensor position. If so, the flow of control comes to a step #23. At the step #23, the driving action on the iris blades 2 is brought to a stop as they have reached the reset sensor position. At a step # 24, a counter is reset. At a step #25, the iris blades 2 are driven to their initial positions. At a step #26, a check is made to find if the value of the counter has become its initial value. If so, the flow comes to a step #27.

At the step #27, the A/D converted value of the luminance signal is inputted for the purpose of commencing AF control. At a step #28, a check is made to find if the value of a difference between the A/D converted value obtained by the step #27 and a preset reference value is above "10". If so, the flow comes to a step #29. At the step #29, the iris blades 2 are driven in the direction of the plus or minus sign of the difference at "time/pulse-number =10/10", as the absolute value of the difference is found to be above "10" at the step #28. If the absolute value of the difference is found to be not above "10" at the step #28, the flow comes to a step #30.

At the step #30, a check is made to find if the absolute value of the difference between the A/D converted value and the preset reference value is above "6". If so, the flow comes to a step #31. At the step #31, the iris blades 2 are driven in the direction of the plus or minus sign of the difference at "time/pulse-number =6/4", as the absolute value of the difference is found to be above "6" at the step #30. If the difference is found to be not above "6" at the step #30, the flow comes to a step #32.

At the step #32, a check is made to find if the absolute value of the difference between the A/D converted value obtained by the step #27 and the preset reference value is above "2". If so, the flow comes to a step #33. At the step #33, the iris blades 2 are driven in the direction of the plus or minus sign of the difference at "time/pulse-number =8/4", as the absolute value of the difference is found to be above "2" at the step #30. If the absolute value of the difference is found to be not above "2" at the step #30, the flow comes to a step #34. the step #34, a check is made to find if the absolute value of the difference between the A/D converted value obtained by the step #27 and the preset reference value is "0". If not, the flow comes to a step #35. At the step #35, the iris blades 2 are driven at "time/pulsenumber =10/2" in the direction of the plus or minus sign of the difference, as the difference is found not "0" at the step #30. If the absolute value of the difference is found to be "0" at the step #30, the flow comes to a step #36. At the step #36, the driving action is brought to a stop as the difference is found to be "0" at the step #30.

At a step #37, a check is made to find if the A/D converted value obtained by the step #27 is equal to the reference value. If so, the flow comes to a step #38 to bring the driving action to a stop.

Figure 7:
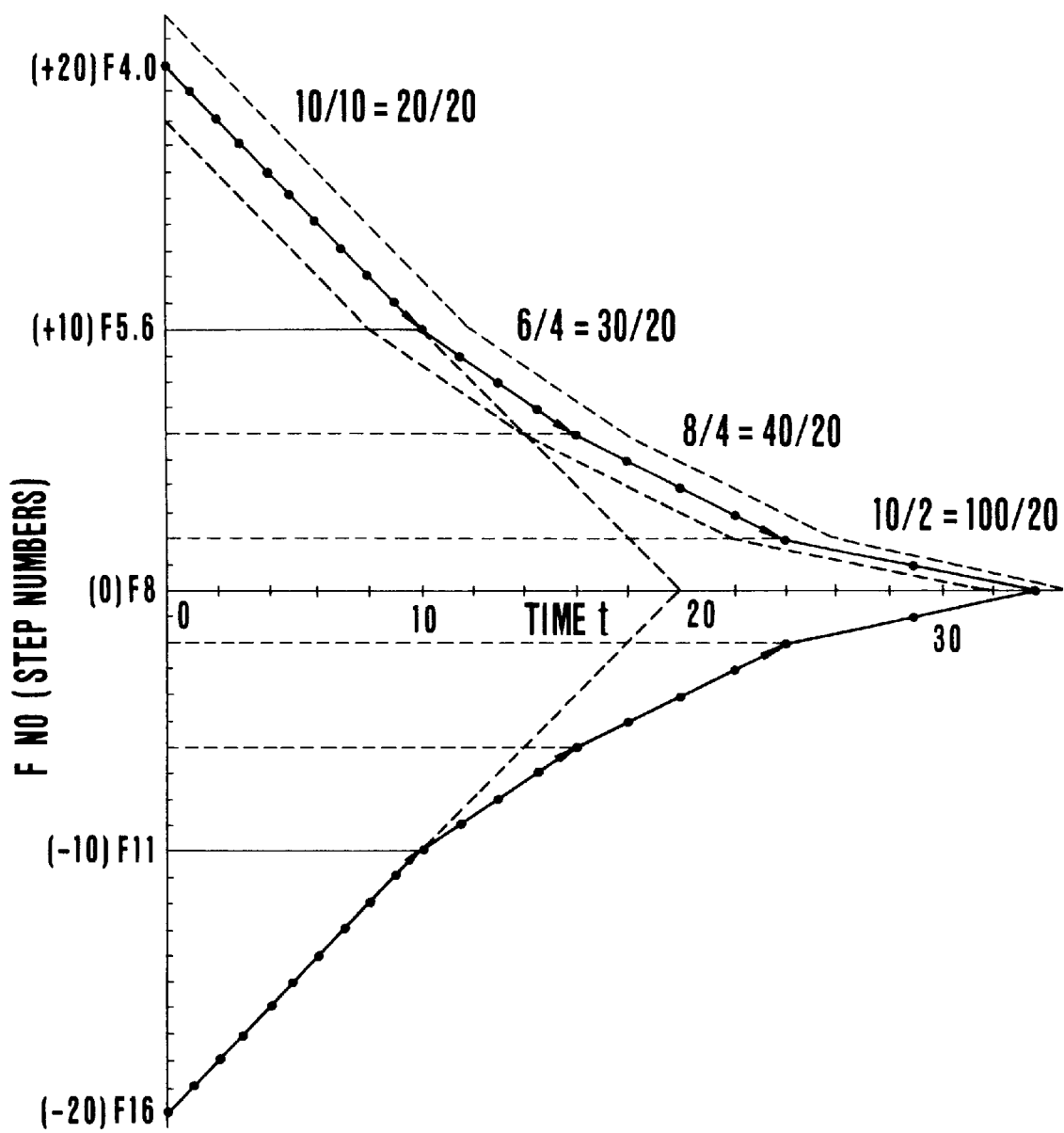
FIG. 7 is a graph showing a relation between the iris blade driving time and the opening amount of the aperture in the control actions shown in FIG. 6.

The driving action of the stepping motor on the iris blades 2 is controlled by repeating the actions described above. With the iris blades 2 controlled in the manner as described above, the incident light can be smoothly converged in relation to the reference value as shown in a graph of FIG. 7.

FIG. 8 shows a fourth embodiment of this invention. A luminance signal which has undergone an integrating detection process in the same manner as in the case of FIG. 1 is taken in by a camera microcomputer 7. The luminance signal is then compared with a reference value by a comparator 8 within the camera microcomputer 7. Then, iris driving information which is obtained as the result of comparison is transmitted to a lens microcomputer 14 via a communication line 15 arranged between the camera microcomputer 7 and the lens microcomputer 14. The lens microcomputer 14 converts the iris driving information into a rectangular wave which has a certain period, and supplies it to a driver 12. The driver 12 supplies a power to a stepping motor 13 for driving iris blades 2. The stepping motor 13 drives the iris blades 2 accordingly.

Further, the camera microcomputer 7 counts the number of pulses of the rectangular wave output. An encoder 11 is arranged to output information which enables the camera microcomputer 7 to know how far the current position of the iris blades 2 is away from their reset position by counting the number of pulses of the rectangular wave. When a power supply is turned on, a reset sensor confirms the reset position of the iris blades 2 and resets a counter which is disposed within the lens microcomputer 14.

Figure 9A:
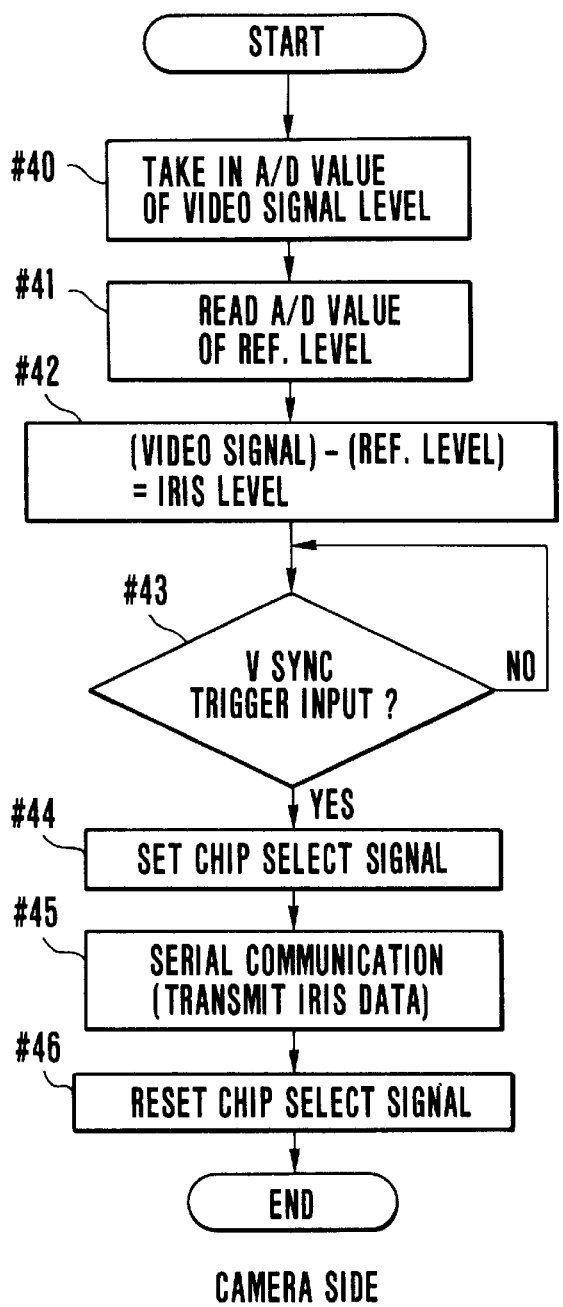
FIGS. 9(a) and 9(b) are flow charts showing control actions to be carried out by a lens microcomputer and a camera microcomputer in the arrangement of FIG. 8.

Next, the control actions to be executed within the camera microcomputer 7 is described below with reference to FIG. 9(a) which is a flow chart:

At a step #40, a luminance signal outputted from a camera signal processing circuit 4 is integrated by an integrating detector circuit 6. The output of the circuit 6 is taken in by the camera microcomputer 7. At a step #41, a reference level data is taken in by the camera microcomputer 7. At a step #42, the camera microcomputer 7 carries out an arithmetic operation of "the integrated value of video signal—the reference level". At a step #43, the flow of control waits for the input of a video vertical synchronizing signal (Vsync). At a step #44, a chip select signal is outputted. At a step #45, iris data (aperture values) is parallel-to-serial converted and is transmitted from the camera microcomputer 7 to the lens microcomputer 14 through the communication line 15. At a step #46, the chip select signal is updated.

The flow of the control actions described above is repeated in a given cycle for communication of control information between a camera unit and a lens unit. Iris control and various control actions are thus executed.

The communication of iris control information from the camera unit to the lens unit is completed at the step #46. The communication is repeated in a given cycle.

Figure 9B:
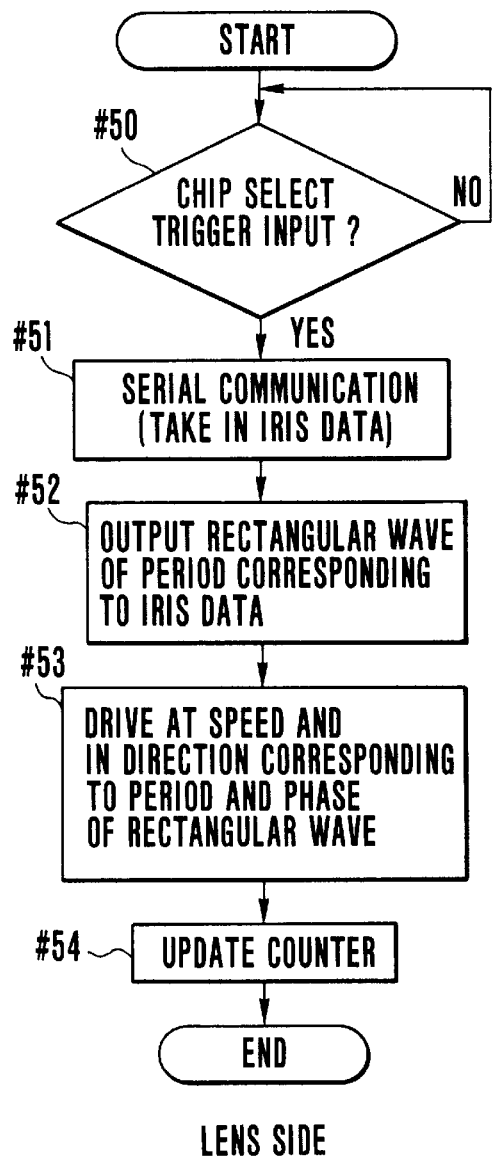

Referring to FIG. 9(b), the actions of the lens microcomputer 14 to be executed on the basis of the data transmitted from the camera unit are described as follows:

At a step #50, a check is made for the input of a chip select signal. Upon confirmation of the input, the flow of the actions comes to a step #51. At the step #51, iris data is taken in by the lens microcomputer 14 through a serial-to-parallel conversion process. At a step #52, the lens microcomputer 14 supplies the driver 12 with a rectangular wave having a direction and a speed which correspond to aperture values indicated by data received. At a step #53, the driver 12 drives the stepping motor 13 a speed and a direction which correspond to the period and phase of the rectangular wave received. At a step #54, the value of the counter is updated.

Control information is communicated between the camera unit and the lens unit by repeating the flow of control described above in a given cycle. Control over the iris and other control actions are thus executed.

According to the arrangement of the third and fourth embodiments described above, the driving speed of the stepping motor is slowed down when a difference between the luminance signal and a reference luminance value becomes less than a certain level, so that any transient changes of luminance and hunting can be prevented by smoothly converging the incident light in relation to the reference luminance value.

The following describes the iris device, the arrangement and function of a fifth embodiment of this invention with reference to FIGS. 10 to 13:

FIG. 10 shows the arrangement of the essential parts of a video camera which has an iris device arranged according to this invention. Referring to FIG. 10, the illustration includes an image pickup lens 101, a stepping motor 102 which is arranged to drive an iris, iris blades 103, a reset switch 104 which consists of a photointerrupter, a leaf switch, etc., and is arranged to detect the closed position of the iris blades 103, a motor driver 105 which is arranged to drive the stepping motor 102, a reset switch interface circuit 106 which is arranged to make the signal of the reset switch 104 into a code signal (digital signal), an image sensor 107, a camera signal processing circuit 108 which is arranged to electrically process a signal coming from the image sensor 107, an integrating circuit 109 which is arranged to make the opening and closing positions of the iris blades 103 apposite by integrating a luminance signal from the camera signal processing circuit 108 only for the period of vertical synchronization time, a microcomputer 110, and manual driving means 111 which is provided for giving an instruction to the microcomputer 110 for manual control over the iris.

Figure 11:
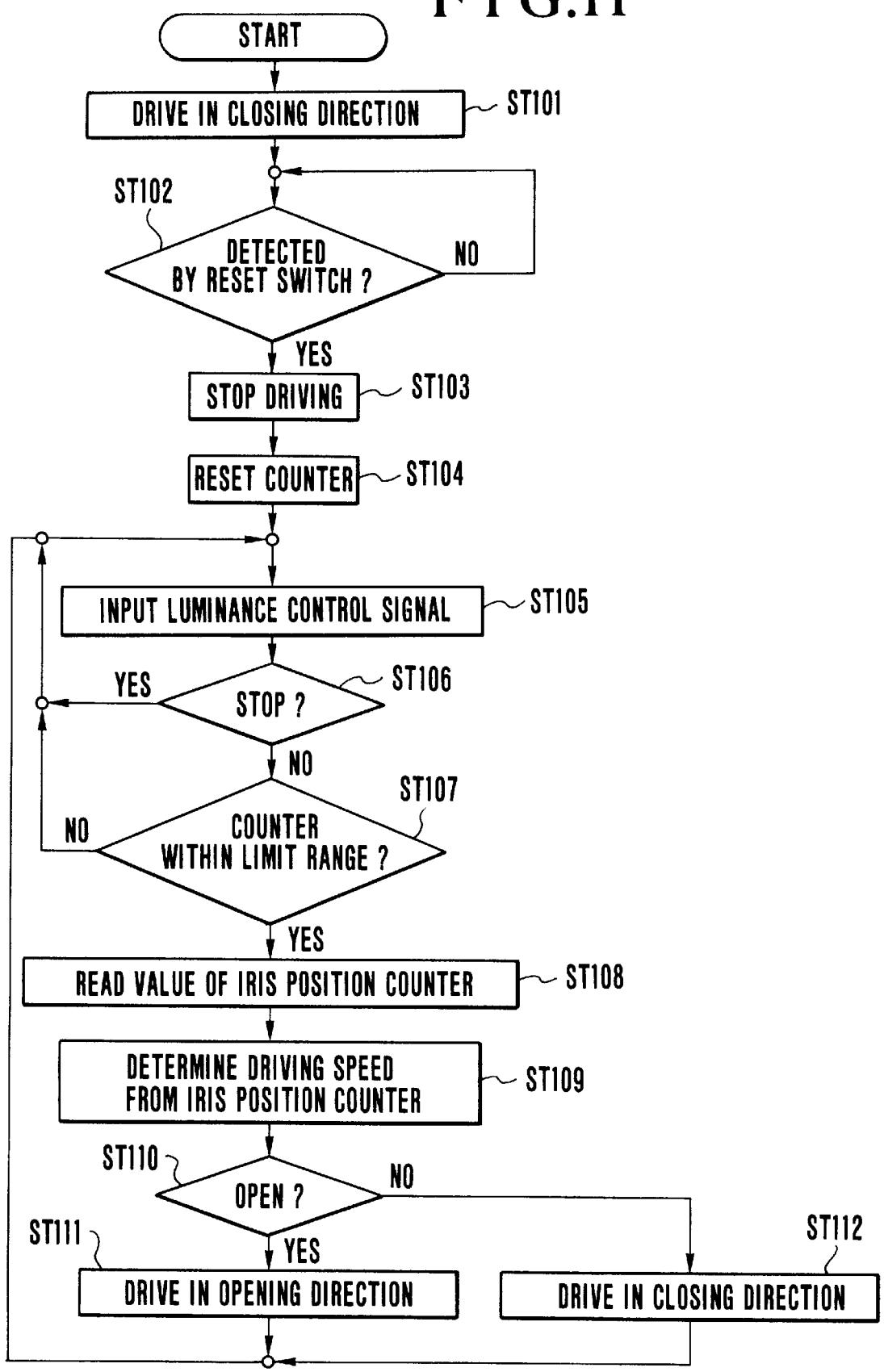
FIG. 11 is a flow chart showing the control actions of a microcomputer shown in FIG. 10 and the function of the iris device of the fifth embodiment.

The iris control actions to be executed by the microcomputer 110 are described as follows with reference to FIG. 11, which is a flow chart showing the flow of control actions: At a step ST101, when a power supply is turned on, the microcomputer 110 sends a signal to the motor driver 105 to cause the stepping motor 102 to move and reset the iris blades 103 in their initial (closed) position. At a step ST102, the reset switch 104 is caused to find if the iris blades 103 are in their initial position. If so, the flow comes to a step ST103.

At the step ST103, the stepping motor 102 is stopped from driving. At a step ST104, the value of an iris position counter provided within the microcomputer 110 is initialized. At that time, count values for the closed and open end positions of the iris blades 103 (limit values) are also stored. An initial value setting action is thus completed. At a step ST105, a luminance signal from the integrating circuit 109 is inputted and set as the current quantity of light within the microcomputer 110. At a step ST106, the luminance signal obtained by the step ST105 is compared with an apposite luminance value set beforehand within the microcomputer 110 to find if the current quantity of light is within the range of apposite luminance and it is not necessary to drive the iris blades 103 any further. If so, the flow comes back to the step ST105. If not, the flow comes to a step ST107.

At the step ST107, a check is made to find if the position of the iris blades 103 as indicated within the microcomputer 110 is at a limit value. If so, the flow comes back to the step ST105 and the stepping motor 102 is not allowed to drive the iris blades 103. At a step ST108, the current opening or closing position of the iris blades 103 is read from the iris position counter within the microcomputer 110. At a step ST109, the driving speed of the stepping motor 102 is determined from the position of the iris blades 103 read at the step ST108 by referring to a stepping motor driving speed map provided within the microcomputer 110 for the positions of the iris. At a step ST110, a check is made to decide, from the current quantity of light, whether the iris blades 103 are to be driven in the direction of opening them or closing them. The flow comes to a step ST111 if it is decided to drive the iris blades 103 in the opening direction or comes to a step ST112 if it is decided to drive the iris blades 103 in the closing direction. At the step ST111, the microcomputer 110 instructs the motor driver 105 to cause the stepping motor 102 to move the iris blades 103 in the opening direction. At the step ST112, the microcomputer 110 instructs the motor driver 105 to cause the stepping motor 102 to move the iris blades 103 in the closing direction.

In the embodiment, the stepping motor is driven at a variable speed according to the value of aperture to cause the stepping motor to drive the iris blades at varied speeds from its open position to its closed position. If the motor is driven at a constant speed throughout the whole aperture range like in the case of the conventional iris device, the moving speed of the iris blades increases up to an undesirable speed in the area of smaller aperture values as shown by a broken line in FIG. 13. The constant speed driving thus brings about a problem such as hunting in video shooting. On the other hand, the iris device according to this invention is arranged to have the microcomputer 110 read the current F-number value and set the driving speed of the stepping motor 102 at such a variable value that makes the stopping-down speed to be constant for all the F-number positions of the iris blades. With the stepping motor speed set in this manner, the stepping motor 102 is controlled according to the set speed, so that the amount of change in quantity of light can be made constant to give a light quantity varying curve as shown by a full line in FIG. 13.

Figure 12A:
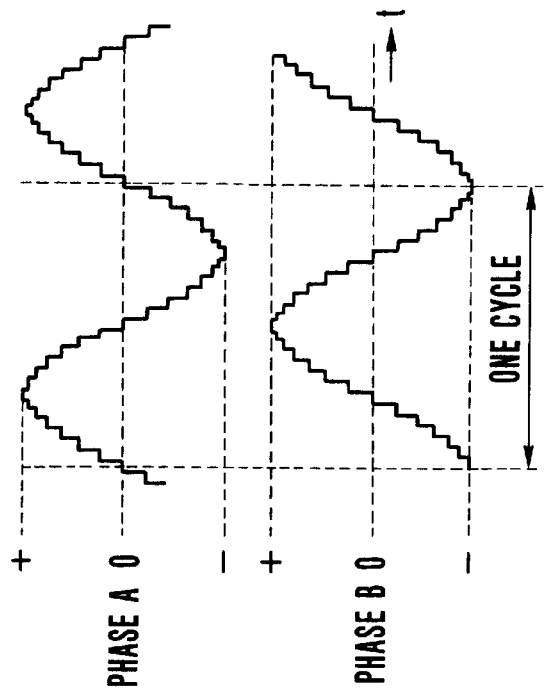
FIGS. 12(a) to 12(d) show driving signals to be applied to the stepping motor of the iris device in relation to changes taking place in the torque of the stepping motor.
Figure 12B:
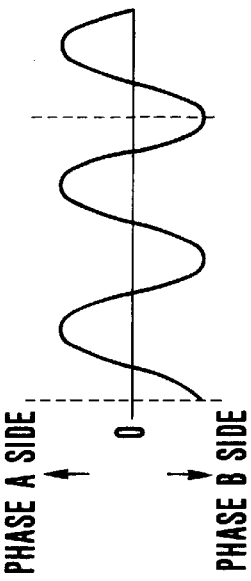
Figure 12C:
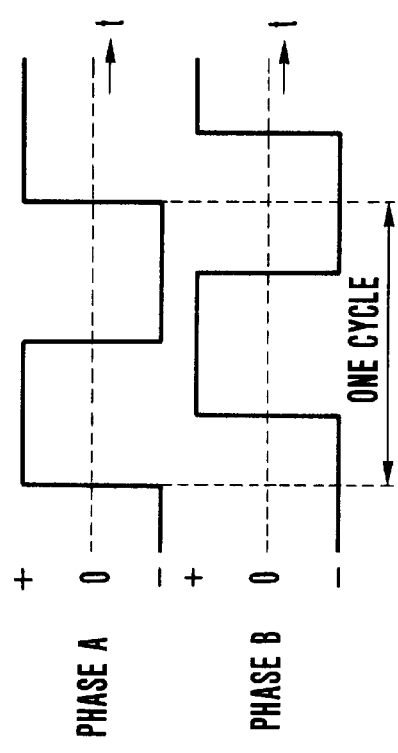
Figure 12D:
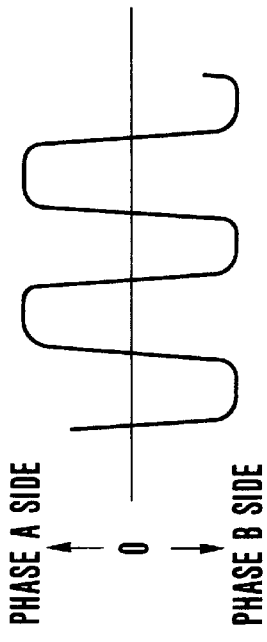
Figure 13:
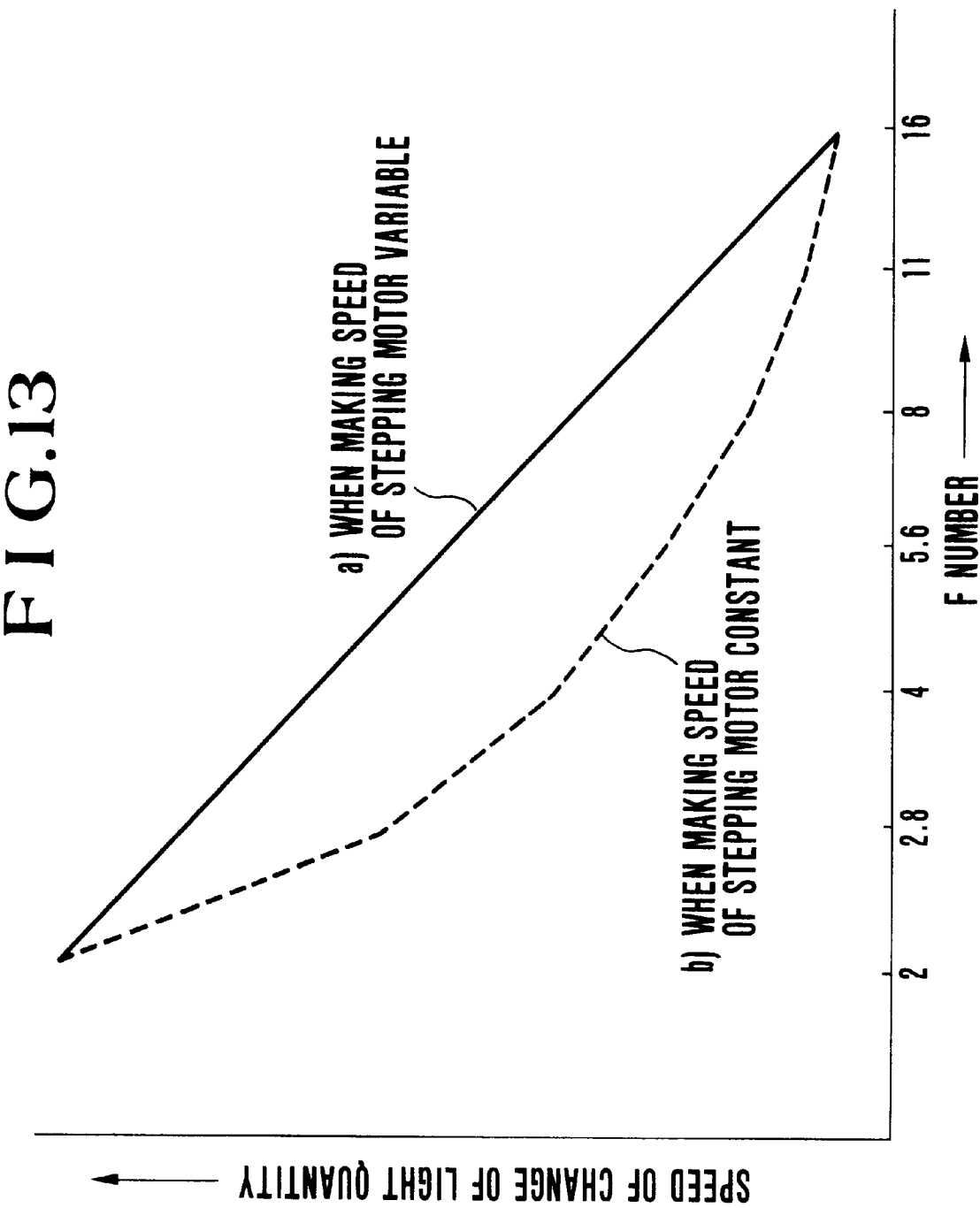
FIG. 13 is a graph showing the speed of the stepping motor in relation to the quantity of light obtained through the iris device.

The microstep driving which is realized by this embodiment is arranged as follows: Ordinary driving by the stepping motor is shown in FIG. 12(a), while the microstep driving is shown in FIG. 12(c). As shown in FIG. 12(c), the motor terminal voltage is divided within each period of time until it reaches a peak voltage value. With the motor terminal voltage divided in this manner, the stepping motor can be finely moved as much as a voltage ratio between phases A and B of the stepping motor obtained at that time. However, the stepping motor has a detent torque, which causes the magnet of a rotor to be sucked by the iron core of a stator the instant the power is not applied simultaneously for the phases A and B, as indicated by a torque curve in FIG. 12(b). Therefore, in the case of microstep driving which equally divides the voltage, the angle of steps cannot be adequately divided into small parts. To avoid the adverse effect of the detent torque, the embodiment is arranged to have a voltage waveform set beforehand within the microcomputer 110 in a form which is close to a sine wave, starting from zero volt and gradually lowering from a high voltage as shown in FIG. 12(c), without changing the voltage change-over time for the microsteps. This arrangement makes it possible to obtain microsteps by a voltage ratio between the phases A and B of the stepping motor, so that the resolution of the iris device can be enhanced. FIG. 12(d) show a torque curve of microsteps of the driving voltage of the stepping motor obtained by the arrangement of this embodiment.

A sixth embodiment of this invention is next described with reference to FIG. 14. The component parts of the iris device of the sixth embodiment are arranged externally in the same manner as the fifth embodiment and are as shown in FIG. 10. Therefore, the details of their arrangement are omitted from the following description.

The functions and actions of the iris device of the sixth embodiment (the operation of the microcomputer 110) are described below with reference to FIG. 14:

At a step ST201, the microcomputer 110 sends a signal to the motor driver 105 to cause the stepping motor 102 to reset the iris blades 103 in an initial position (a closed position) when the power supply is turned on. At a step ST202, the reset switch 104 is checked to find if the iris blades 103 are in the initial position. If so, the flow of control actions comes to a step ST203. At the step ST203, the stepping motor 102 is brought to a stop. At a step ST204, the value of the iris position counter disposed within the microcomputer 110 is reset (initialized). At that time, count values for the closed- and open-end positions of the iris (limit values) are also stored within the microcomputer 110. An initial value setting action thus comes to an end.

At a step ST205, a luminance signal from the integrating circuit 109 is inputted to the microcomputer 110. The microcomputer 110 then sets it as the current quantity of light. At a step ST206, the luminance signal obtained by the step ST205 is compared with a preset apposite luminance value within the microcomputer 110. If the current quantity of light is found, as a result of the comparison, to be within the range of adequate luminance and thus does not require any further driving action on the iris blades 103, the flow comes back to the step ST205. If not, the flow comes to a step ST207.

At the step ST207, a check is made to find if the position of the iris blades 103 is at the limit value stored in the microcomputer 110. In the event of the limit value, the flow comes back to the step ST205 to have the stepping motor 102 not driven. If the position of the iris blades 103 is found at the step ST207 to be not at any of the limit values stored, the flow comes to a step ST208. At the step ST208, the luminance value from the integrating circuit 109 is compared with the adequate luminance value within the microcomputer 110 to decide whether the iris blades 103 are to be moved in the direction of opening or closing them. If it is decided that the iris blades 103 are to be moved in the opening direction, the flow comes to a step ST209.

At the step ST209, a check is made to find if the current value of the iris position counter disposed within the microcomputer 110 is at F8 (which corresponds to a medium aperture). If the value of the iris counter of the microcomputer 110 is found to be above F8, the flow comes to a step ST210. If the value is found to be below F8, the flow comes to a step ST211.

At the step ST210, the microcomputer 110 instructs the motor driver 105 to drive the stepping motor 102 in the microstep wave driving mode. At the step ST211, the microcomputer 110 instructs the motor driver 105 to drive the stepping motor 102 in the rectangular wave driving mode. At a step ST212, the motor driver 105 drives the stepping motor 102 to move the iris blades 103 in the opening direction in the mode of driving waveform decided at the step ST210 or at the step ST211 as applicable.

In a case where the iris blade driving direction is decided to be in the closing direction at the step ST208, the flow comes to a step 213.

At the step 213, the iris position counter of the microcomputer 110 is checked for F8 (corresponding to the medium aperture). If the counter is found to be at a value less than F8, the flow comes to a step ST214. At the step ST214, the microcomputer 110 instructs the motor driver 105 to drive the stepping motor 102 in the rectangular wave driving mode. If the iris position counter is found at the step ST213 at a value above F8, the flow comes to a step ST215. At the step ST215, the microcomputer 110 instructs the motor driver 105 to drive the stepping motor 102 in the microstep wave driving mode.

At a step ST216, the motor driver 105 drives the stepping motor 102 in the driving mode decided either at the step ST214 or ST215, as applicable, to move the iris blades 103 in the direction of closing them.

The arrangement of the iris devices of the fifth and sixth embodiments of this invention described above gives the following advantages:

(i) Open-loop control can be carried out without necessitating use of any sensor.

(ii) The resolution of the device is increasable by virtue of microstep driving, so that control performance for small apertures can be enhanced.

(iii) The variable speed driving makes the changing speed of light quantity constant, so that control over the light quantity at each F-number can be easily accomplished.

What is claimed is:

1. An optical apparatus comprising:
a) a light quantity adjusting member arranged to move to vary a quantity of light;
b) a drive source for driving said light quantity adjusting member, a stepping motor being employed as said drive source;
c) luminance detecting means for detecting the luminance of an object to be photographed, on the basis of the quantity of light obtained through said light quantity adjusting member; and
d) a control circuit for driving and controlling said stepping motor in such a way as to change the driving speed of said stepping motor from a first speed to a second speed which is lower than said first speed by changing the driving of said stepping motor from a rectangular wave driving mode to a microstep wave driving mode having a longer period when the difference between said object luminance and a target luminance becomes less than a first value, and to change the driving speed of said stepping motor from said second speed to a third speed which is lower than said second speed by changing the driving of said microstep wave driving mode having a much longer period when the difference between said object luminance and said target luminance value becomes less than a second value, said second value being smaller than said first value.

2. An optical apparatus according to claim 1, wherein said control circuit includes a microcomputer.

3. An apparatus according to claim 1, wherein said control circuit is arranged to drive said stepping motor to move said light quantity adjusting member to a reset position thereof and, after that, to determine a light quantity adjusting state of said light quantity adjusting member on the basis of a driving direction and driving amount of said stepping motor.

4. An apparatus according to claim 1, further comprising:
an image sensor which photoelectrically converts a light flux which has passed said light quantity adjusting member, wherein said luminance detecting means detects the luminance of an object from an output of said image sensor.

5. An apparatus according to claim 4, wherein said optical apparatus is a video camera.

6. An optical apparatus comprising:
a) a light quantity adjusting member arranged to move to vary a quantity of light;
b) a drive source for driving said light quantity adjusting member, a stepping motor being employed as said drive source;
c) luminance detecting means for detecting the luminance of an object to be photographed, on the basis of the quantity of light obtained through said light quantity adjusting member; and
d) a control circuit for driving and controlling said stepping motor in such a way as to change over from a rectangular wave driving mode to a microstep driving mode, as difference between said object luminance and a target luminance decreases and to decelerate the driving speed of said stepping motor by elongating a period of a microstep after the change over to the microstep driving mode.

7. An optical apparatus according to claim 6, wherein said control circuit includes a microcomputer.

8. An optical apparatus according to claim 6, wherein said control circuit is arranged to drive said stepping motor to move said light quantity adjusting member to a reset position thereof and, after that, to determine a light quantity adjusting state of said light quantity adjusting member on the basis of a driving direction and driving amount of said stepping motor.

9. An optical apparatus according to claim 6, further comprising:
an image sensor which photoelectrically converts a light flux which has passed said light quantity adjusting member, wherein said luminance detecting means detects the luminance of an object from an output of said image sensor.

10. An optical apparatus according to claim 9, wherein said optical apparatus is a video camera.

* * * * *

UNITED STATES PATENT AND TRADEMARK OFFICE
CERTIFICATE OF CORRECTION

PATENT NO. : 5,953,062
DATED : September 14, 1999
INVENTOR(S) : Masami Sugimori, et al.

Figure 5:
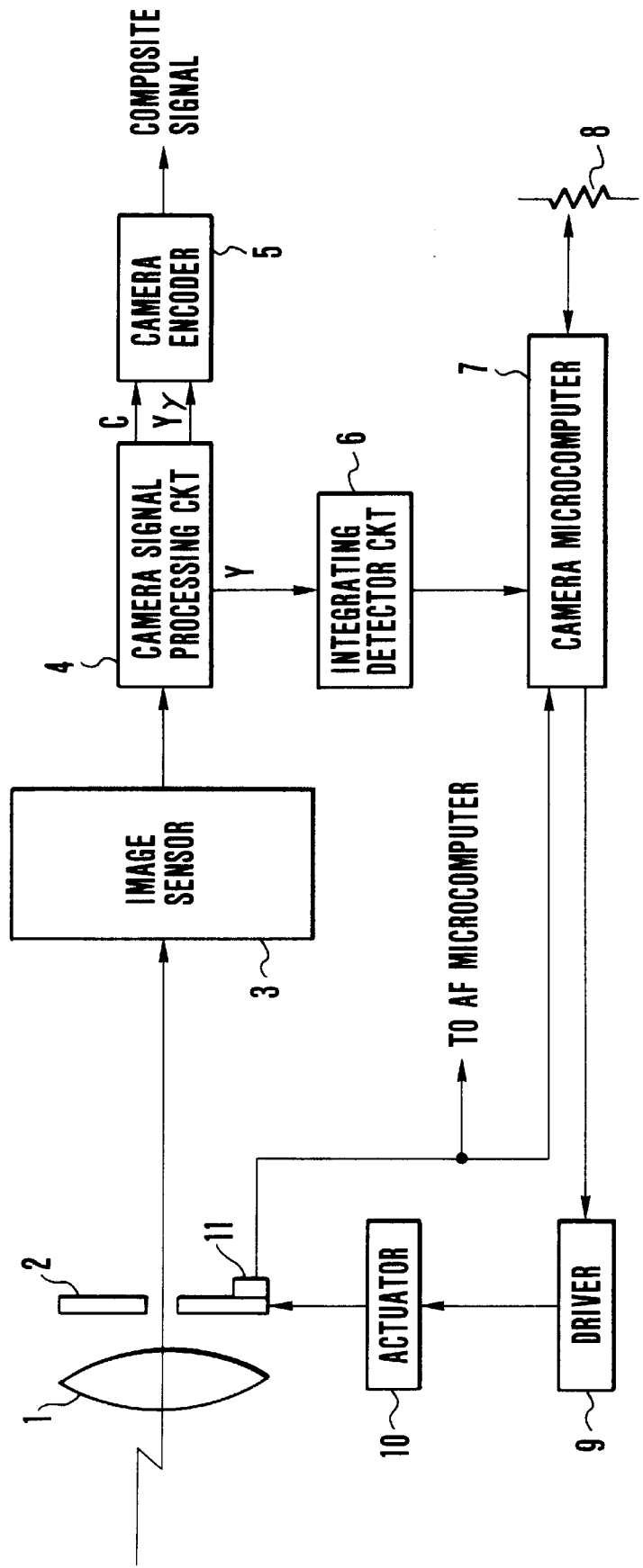
FIG. 5 is a block diagram showing in outline the essential parts of a video camera which is provided with the conventional automatic exposure control device.

It is certified that error appears in the above-identified patent and that said Letters Patent are hereby corrected as shown below:

Col. 1, line 17, delete "FIG. 5:" and insert -- FIG. 5. --
Col. 1, line 63, delete "which is" and insert -- which are --.
Col. 3, line 25, delete "follows" and insert -- follows. --.
Col. 3, line 67, delete "FIG. 2:" and insert -- FIG. 2. --.
Col. 4, line 3, delete "has come" and insert -- have come --.
Col. 4, line 56, delete "follows:" and insert -- follows. --.
Col. 5, line 3, delete "follows:" and insert -- follows. --.
Col. 5, line 21, delete "is described" and insert -- are described --.
Col. 5, line 21, delete "follows:" and insert -- follows. --.
Col. 5, line 62, delete "the step" and insert -- At the step --.
Col. 6, line 42, delete "is described" and insert -- are described --.
Col 6, line 43, delete "chart: and insert -- chart. --.
Col. 6, line 67, delete "follows:" and insert -- follows. --.
Col. 7, line 26, delete "10 to 13:" and insert -- 10 to 13. --.
Col. 7, line 50, delete "actions:" and insert -- actions. --.
Col. 8, line 51, delete "follows:" and insert -- follows. --.
Col. 9, line 18, delete "FIG. 14:" and insert -- FIG. 14. --.

Signed and Sealed this

Tenth Day of April, 2001

Attest:

NICHOLAS P. GODICI

*Attesting Officer*        *Acting Director of the United States Patent and Trademark Office*